United States Patent [19]

Luhmer et al.

[11] Patent Number: 5,014,467

[45] Date of Patent: May 14, 1991

[54] METHOD AND MACHINE FOR THE DISCONTINUOUS GENERATING GRINDING WITH INDEXING

[75] Inventors: Udo Luhmer, Gröbenzell; Udo Schapp, Wessling, both of Fed. Rep. of Germany

[73] Assignee: Carl Hurth Maschinen- und Zahnradfabrik GmbH & Co., Munich, Fed. Rep. of Germany

[21] Appl. No.: 257,219

[22] Filed: Oct. 13, 1988

[30] Foreign Application Priority Data

Oct. 14, 1987 [DE] Fed. Rep. of Germany ....... 3734828

[51] Int. Cl.$^5$ ............................................. B24B 1/00
[52] U.S. Cl. ................................. 51/287; 51/165.71; 51/165.77; 51/56 G; 51/123 G
[58] Field of Search ............... 51/287, 165.71, 165.72, 51/165.77, 165 R, 34 R, 40, 42, 52 R, 56 G, 123 G

[56] References Cited

U.S. PATENT DOCUMENTS

| | | | |
|---|---|---|---|
| 3,763,598 | 10/1973 | Hofler | 51/287 |
| 3,906,677 | 9/1975 | Gunter et al. | |
| 3,916,569 | 11/1975 | Wydler et al. | 51/287 |
| 3,986,305 | 10/1976 | Gunter et al. | |
| 4,400,916 | 8/1983 | Bloch et al. | 51/287 |
| 4,551,954 | 11/1985 | Bloch et al. | 51/287 |
| 4,606,153 | 8/1986 | Bloch et al. | 51/287 |
| 4,833,836 | 5/1989 | Tang | 51/287 |

FOREIGN PATENT DOCUMENTS 1294787 5/1969 Fed. Rep. of Germany ........ 51/287
2050946 4/1972 Fed. Rep. of Germany .

OTHER PUBLICATIONS

Maag-Taschenbuch, second edition, 1985, p. 318 under d.

Primary Examiner—Frederick R. Schmidt
Assistant Examiner—Blynn Shideler
Attorney, Agent, or Firm—Flynn, Thiel, Boutell & Tanis

[57] ABSTRACT

A method and a machine for the discontinuous generating grinding with indexing of the tooth flanks (14) of gears. The rotating grinding wheel (T) carries out several back and forth feed movements (X) from one axial side face of a tooth to the other. The gear (W) is rotated a small amount (rolling step s) at each change of direction point and the grinding wheel (T) is adjusted in the axial direction (rolling stroke $\Delta Z$). To produce corrections on the tooth flank (14), the grinding wheel can, during the feed movements (X), carry out additional lifting movements ($\Delta K$) in direction of the rolling stroke ($\Delta Z$).

4 Claims, 3 Drawing Sheets

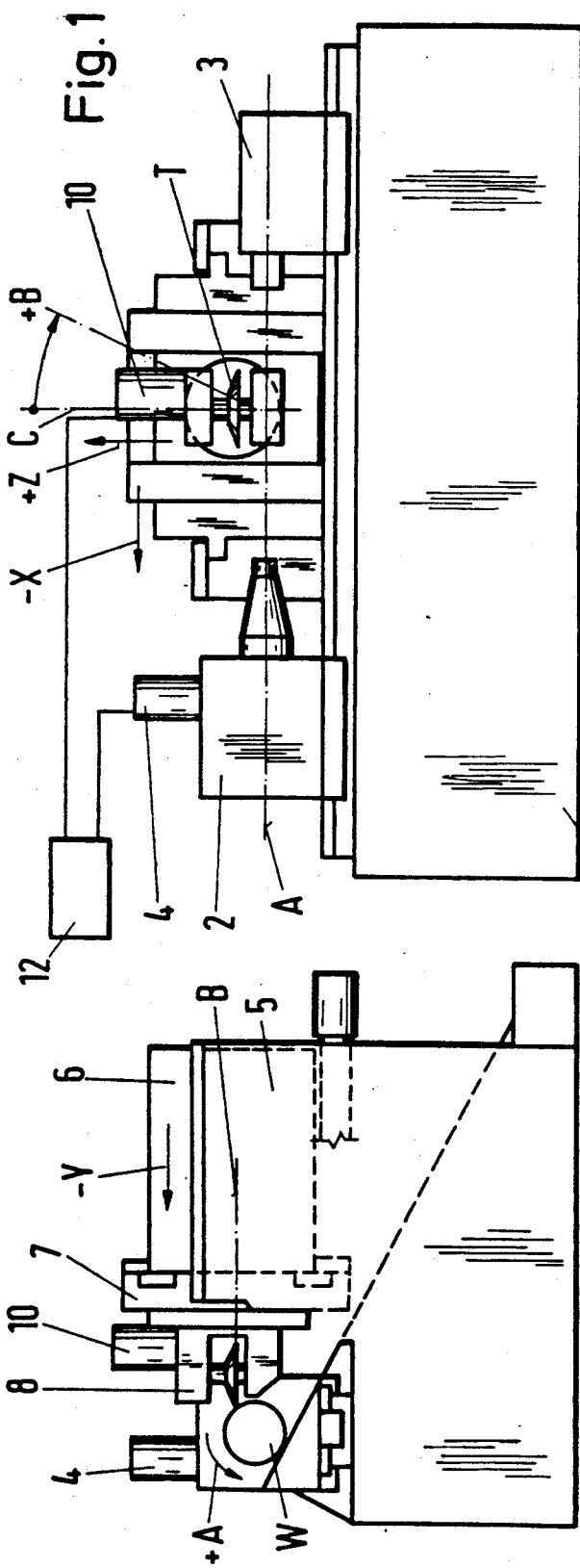
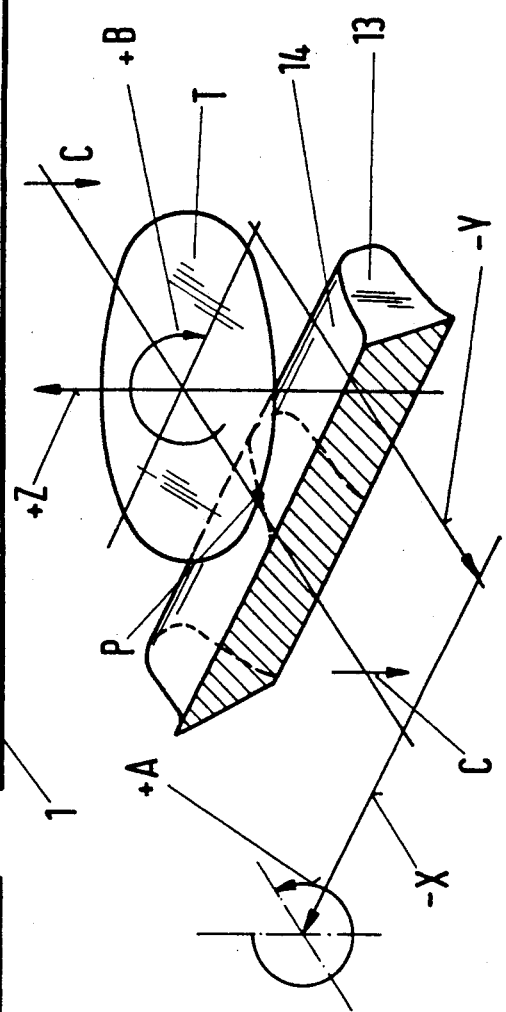

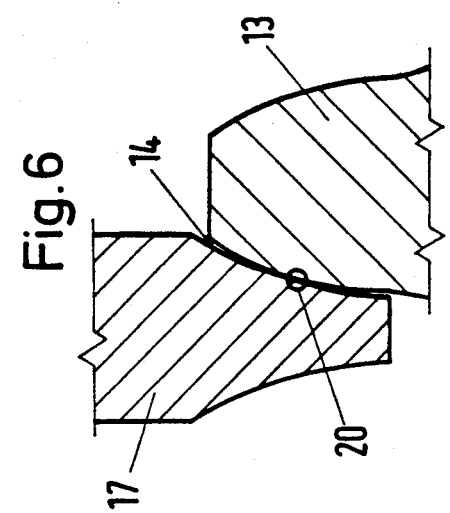
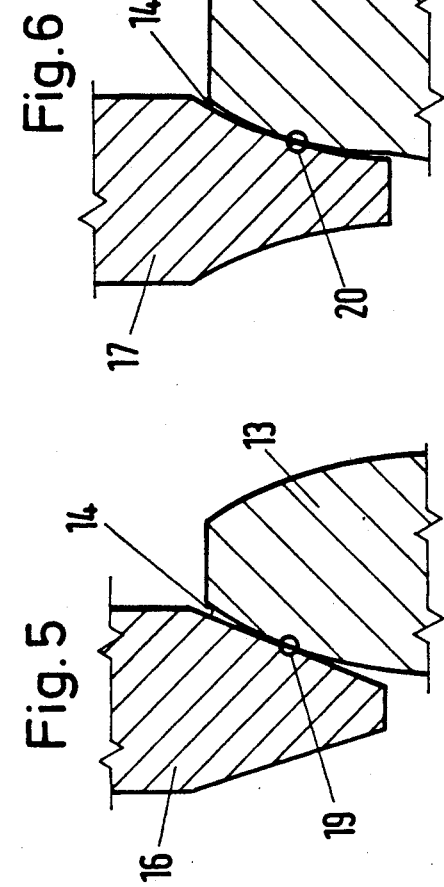
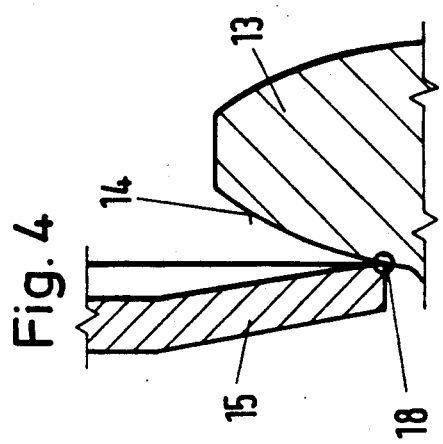
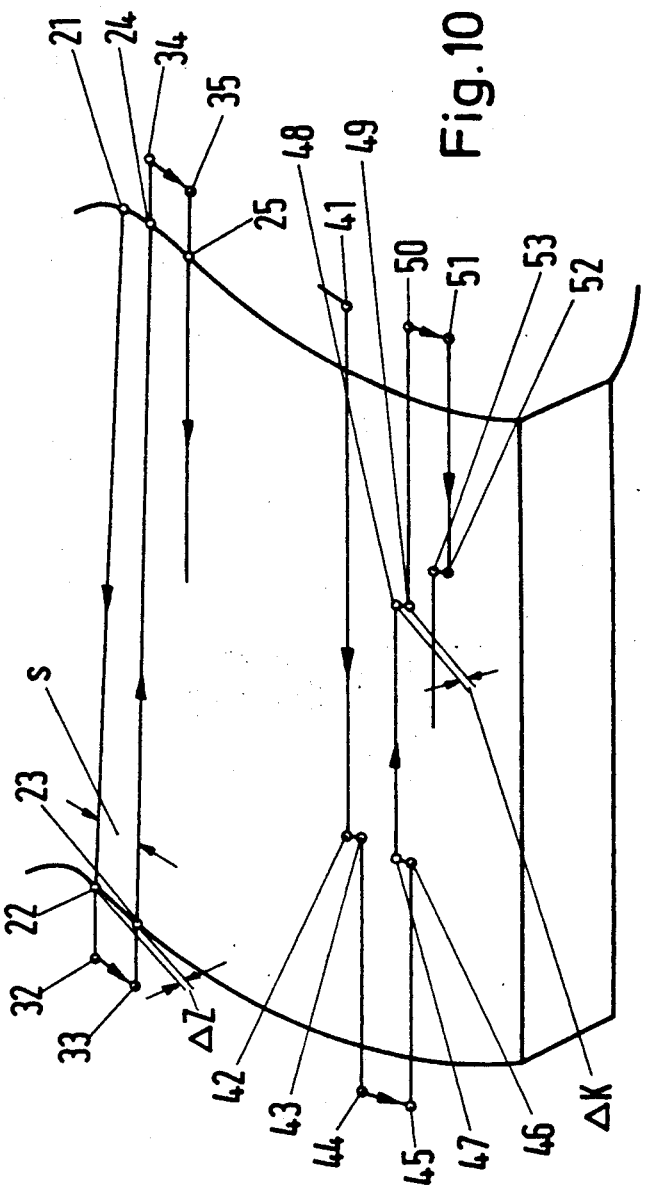

METHOD AND MACHINE FOR THE DISCONTINUOUS GENERATING GRINDING WITH INDEXING

FIELD OF THE INVENTION

The invention relates to a method for the generating grinding with indexing of gears and a machine suited therefor.

BACKGROUND OF THE INVENTION

Precision machining requirements occurring during the precision working of hardened gears extend today from mass production to individual piece manufacturing. While methods and machines exist in the precision working of unhardened gears, which methods and machines are established and capable of high production in each individual case, this is not true to the same extent as for precision working of hardened gears.

Especially for the smallest lot sizes having the highest requirements for exactness and flexibility in the method and with the machine, we are aware of only one machine type on the market today with which it is possible to correct the topography of the tooth flanks (German OS No. 23 07 493 corresponding to U.S. Pat. Nos. 3,906,677 and 3,986,305). Due to the number of operating and adjusting axes, however, the machine requires a considerable amount of time in implementing change over procedures.

The known grinding method is based on a specific rolling position of the tool with respect to the workpiece tooth. This actually fixed rolling position is changed only for the purpose of correction. Two corrective influences are to be considered here, one being a profile correction depending on the rolling and the second being a flank-line correction depending on the grinding stroke in the longitudinal direction of the tooth. The rolling and the feed in the longitudinal direction of the tooth are constant in the adjusted case. This principle has a disadvantage, namely, that the action onto a concrete surface point can occur only "hastily". A goal-oriented operation is therefore not possible in the case of gears coated with a hard material.

A tooth-flank grinding machine operating according to the known generating method is described in German Patent No. 20 50 946. The workpiece is stationarily mounted in this machine and carries out only a rolling movement reduced to a pure rotary movement, whereas the translatoric portion of the rolling movement is associated with the grinding wheel. Because of the continuously occurring rolling movement, it is hardly possible to act onto precise concrete surface points in order to achieve a desired tooth-flank correction.

Therefore, the basic purpose of the invention is to provide a method with which it is possible to very precisely machine gears and to be able to work in a simple manner corrections into the surface of the tooth flanks. Furthermore, the basic purpose includes the provision of a machine having the least possible number of operating and adjusting axes and on which machining can be done according to the aforementioned method and which can be changed over quickly and simply.

This purpose is attained and made possible by the inventively important and novel separation of the movements: the workpiece is axially and radially stationarily mounted and carries out only a rolling movement about its axis of rotation, that is, a pure rotary movement, however, a rolling movement is not carried out during a working stroke of the grinding wheel. The grinding wheel yields, so to speak, during each rolling movement of the workpiece following the desired involute or flank shaping, that is, the grinding wheel moves up the tooth with the aforementioned "yielding" thereby providing a more advantageous movement. If helically toothed gears are ground, grinding occurs from one axial side of the workpiece tooth to the other along helixes, for which purpose the workpiece undergoes a suitable rotary movement during each grinding stroke.

The inventive method can be carried out with a cup-shaped grinding wheel, with which a point contact between the grinding wheel and the tooth flank is theoretically obtained. In practice, however, contact occurs over a narrow sickle-shaped surface. This surface can be reduced, when a bevel grinding wheel is used and still further with a grinding wheel having a concave work surface. Such a small touching or contact surface coming at least close to a point contact is a condition enabling gears, needing corrections in the surface of the tooth flanks, to be ground. It is, however, also important, in order to produce the necessary surface pressure during grinding, if a cubic boron nitride (CBN) coated wheel is used, because among others the small contact surface is important for this case.

Thus a very important characteristic of the novel method and novel machine is that the rolling step, namely, the rotating of the workpiece, and the rolling stroke, namely, the feeding of the grinding wheel in the Z-direction, can occur independently from one another. A whole series of advantages are connected with this and, which are not offered by the method and the machine according to German Patent No. 20 50 946:

When the rolling step and the rolling stroke are in a fixed relationship to one another, exact involutes are then produced, just like in the case of a fixed gear train or through roll cams and roll bands, however, step-by-step, for which reason the method can be identified as discontinuous.

If the relationship is changed, however, remains the same during machining a tooth, then involutes are created which belong to a smaller or larger base circle. Thus these are angle of mesh corrections.

If the relationship is changed during machining of each tooth, then tooth-profile corrections are created in the form of surface crownings or addendum and/or dedendum alterations.

Also during the known gear shaping with generating motion according to the generating method, a rolling movement is not carried out during the operating stroke (Maag-Taschenbuch, second edition, 1985, Page 318 under d). However, not insignificant differences exist between this method and the inventive method:

(a) the rolling cutting is a manufacturing method using a "stationary" tool, the inventive pitch-rolling-grinding is a (precision) machining method with a rotating tool;

(b) during rolling cutting, each feed movement is followed by a non-work producing return stroke in the opposite direction, whereas in the inventive method, each feed movement in one direction is followed by a feed movement in the other direction;

(c) during rolling cutting, the workpiece is guided along the tool with a step-by-step rotation, whereas in the inventive method the workpiece is stationary and the tool, namely the grinding wheel, is moved through a rolling stroke following a corresponding movement through respective rolling step.

DESCRIPTION OF THE DRAWINGS

The invention will be described hereinbelow with reference to the exemplary embodiments illustrated in the drawings, in which:

FIGS. 1 and 2 illustrate a front view and a side view, respectively, of a machine embodying the invention;

FIG. 3 illustrates the position of the axes and the principle of operation;

FIGS. 4 to 6 illustrate various grinding gears in operative contact with a tooth of a workpiece;

FIGS. 7 to 9 illustrate, respectively, the contact surfaces between the grinding gears of FIGS. 4 to 6 and the workpiece;

FIG. 10 is a diagram illustrating a sequence of operation; and

DETAILED DESCRIPTION

Figure 11:
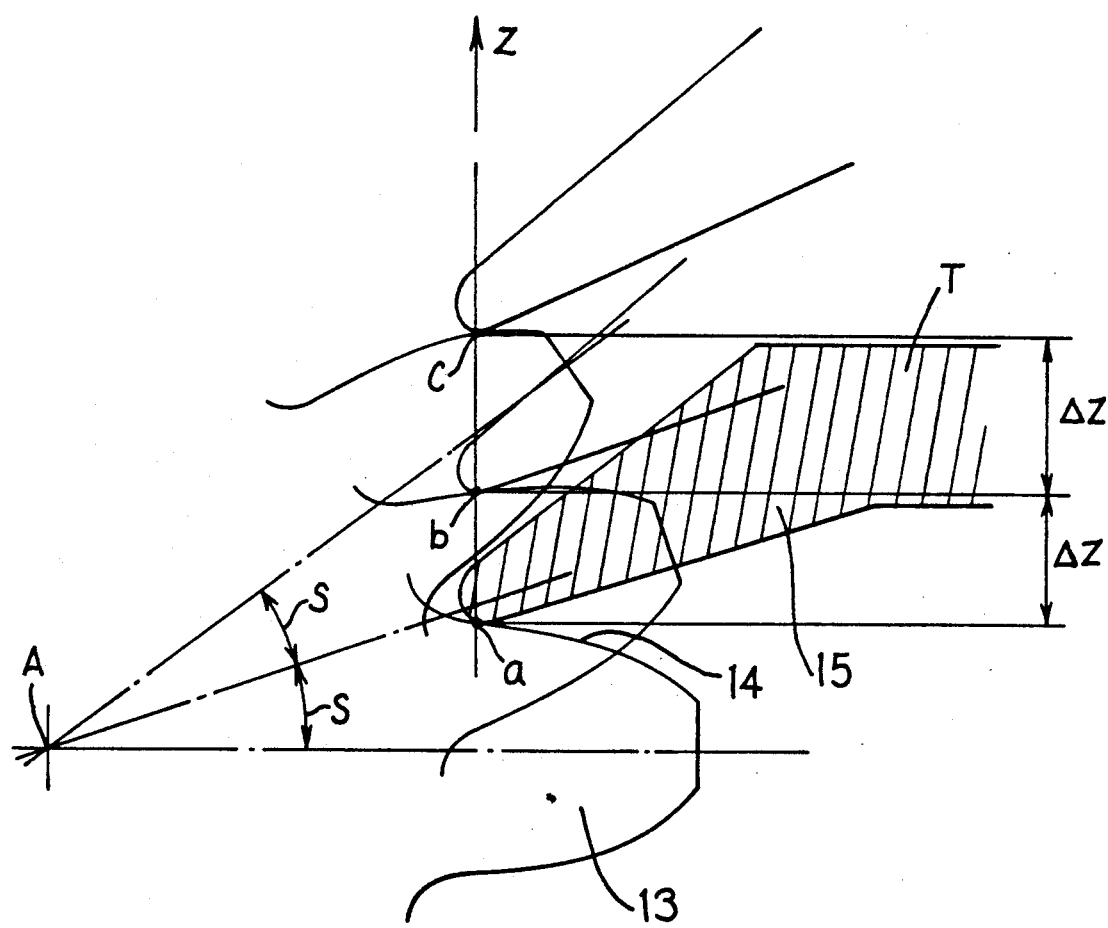
FIG. 11 is a schematic illustration of the various areas of contact between the workpiece and tool during a machining task and using a tool according to FIG. 4.

Two tailstocks 2, 3 are movably arranged on a machine frame 1 to receive a workpiece W therebetween, which workpiece is not illustrated in FIG. 1. One of the tailstocks is equipped with a drive mechanism 4 for the step-by-step and/or continuous rotation of the workpiece W. A plunge-feed carriage 5 is furthermore supported for movement along an axis Y which extends at a right angle with respect to the axis A of the workpiece W mounted on the machine frame 1. A feed carriage 6 is supported for movement along an axis X which extends parallel with respect to the workpiece axis A on the plunge-feed carriage 5. A rocker carriage 7 is supported for movement in direction of an axis Z which extends perpendicularly with respect to the X axis and with respect to the Y axis on the feed carriage 6. The rocker carriage 7 carries a tool head 8 which can be rotatably adjusted by rotation about an axis B, and on which a grinding wheel T with its axis of rotation C is rotatably drivingly supported. The drive mechanisms (not shown) for the carriages 5, 6 and 7, the drive mechanism 4 for the rotary movement of the workpiece W and a drive mechanism 10 for the rotary movement of the grinding wheel T are connected in circuit to a control mechanism 12, with which their movements are controlled corresponding with the respective requirements.

FIG. 3 illustrates again perspectively the arrangement of the axes A, B, C, X, Y, Z, also the cooperation of the grinding wheel T with a flank 14 of a tooth 13 on the workpiece W being machined. The momentary contact surface is identified by the letter P.

FIGS. 4 to 9 illustrate the cooperation or operative engagement of various grinding wheels 15, 16, 17 with the tooth 13, or the flank 14 thereof, and the contact surfaces 18, 19, 20 resulting from the operative engagement.

A method which is to be preferredly carried out on the machine (other method sequences being also possible), or rather the operative sequence of the machine, is illustrated in FIG. 10. Starting out from a first contact point 21 between the grinding wheel T and one face of the flank 14 of the workpiece W, the grinding wheel T carries out a feed movement in the X direction. The contact surface between the grinding wheel T and the flank 14 thus moves on the flank 14 (see points a in FIGS. 10 and 11) to another point 22 adjacent the other axially facing side of the workpiece. The workpiece W is now rotated through one rolling step s about the axis A and the grinding wheel T carries out a very small rolling stroke $\Delta Z$ (point 23) namely a movement exclusively in the Z direction. The illustration in FIG. 11 is considerably enlarged, solely for clarification purposes. The grinding wheel T subsequently carries out an opposite feed movement, during which the contact surface returns on the flank 14 (see points b in FIGS. 10 and 11) to a point 24 adjacent the first axially facing side of the workpiece. Again the workpiece W rotates through one rolling step s about the axis A and the grinding wheel T carries out a rolling stroke $\Delta Z$ (point 25). Further feed movements X, rolling steps s and rolling strokes $\Delta Z$ follow, until the entire flank has been machined. The grinding wheel T is then separated from the workpiece W and the workpiece W carries out a rotary movement of a size equal to one tooth pitch, namely, the adjacent tooth now assumes the position of the illustrated tooth 13 and is machined in the same manner.

If a possible adulteration of the involute shape in the area of the faces is to be avoided, the feed movement X can be continued beyond the point 22 to a point 32, whereat the grinding wheel T is no longer in contact with the flank. The further sequence of operation takes place as indicated above and, the respective points therefor are identified in FIG. 10 by numbers which are each higher by "10".

The grinding wheel T can, caused by the control 12, carry out one time or several times an additional movement $\Delta K$, similar to the rolling stroke $\Delta Z$, along the feed path X. The grinding wheel T thus penetrates locally deeper or less deep into the flank 13. FIG. 10 indicates in form of an example some of these additional movements by the points 41 to 52. In this manner, it is possible to also produce corrections in the topography of the flanks just like with crowned flanks.

A straight-toothed workpiece W is the basis in the illustrated and described method. However, if the work-piece is helically toothed, then the workpiece carries out a rotary movement about the axis B by an amount depending on the size of the pitch angle - while the grinding wheel T carries out the feed movement X -, in order to compensate for the angle (surface inclination) and in order to maintain the operative contact between the grinding wheel T and the flank 13. More specifically, a rotary adjustment of the tool head 8 about the axis B is necessary in order to adjust the position of the tool T and the teeth thereof to the pitch angle (or angle of slope) of the teeth on a helically toothed workpiece.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a method for the machining of tooth flanks of gears through a generating grinding with indexing, in which a rotary movement component of a grinding wheel is associated with an incremental rolling movement and a pitch rotation of a workpiece, in which a translatory component of the grinding wheel is associated with the incremental rolling movement of the workpiece and a grinding-stroke movement of the grinding wheel along the workpiece tooth flanks, and in which, for producing tooth-flank corrections with the grinding wheel, controlled movements of the grinding wheel can be carried out relative to the tooth flanks to be machined during the individual grinding stokes, the improvement wherein the rotary movement component and the translatory component of the associated incremental rolling movement are controllably individually carried out, step-by-step, each between the individual grinding strokes, and wherein the controlled movements of the grinding wheel for producing tooth flank corrections are independently coordinated with the the translatory component of the grinding wheel.

2. The method according to claim 1, wherein the grinding-stroke movements (X) follow one another such that the tooth flank is machined starting out from the dedendum area toward the addendum edge.

3. The method according to claim 1, wherein, during machining of helically toothed gears, grinding is done from one side of the workpiece to the other side along helixes, for which purpose the workpiece undergoes a suitable rotary movement during each grinding stroke.

4. A machine for machining tooth flanks of gear-shaped workpieces through generating grinding with indexing, comprising a machine frame means, a grinding head relatively adjustable to said frame means for drivingly rotationally supporting a grinding wheel and further comprising a means for drivingly rotationally supporting the workpiece to be machined, said workpiece being axially and radially stationary, and said grinding wheel being movable and drivable therefor in a Z-axis direction, aside from in the direction of its axis of rotation, also in the two directions which are directed perpendicularly to the Z-axis and at a right angle to one another (longitudinal feed axis X and plunge-feed axis Y), the improvement wherein control means are provided for controlling the movements of the grinding wheel along the Z-axis independent from the rotary movement of said workpiece.

* * * * *